United States Patent

[11] 3,579,780

[72] Inventors Richard J. Matt
Simsbury;
Ronald E. Restelli, Cromwell, Conn.
[21] Appl. No. 758,358
[22] Filed Sept. 9, 1968
[45] Patented May 25, 1971
[73] Assignee Textron Incorporated
Providence, R.I.

[54] METHOD OF MAKING A BEARING HAVING A FULL COMPLEMENT OF BALLS
16 Claims, 7 Drawing Figs.
[52] U.S. Cl. .................................................. 29/148.4, 29/434, 29/447
[51] Int. Cl. .................................................. B23p 11/00, B23p 11/02, B23b 19/00
[50] Field of Search .................................................. 29/148.4, 447, 148.4 (A), 148.4 (R), (SHFT), (FORGE), 434

[56] References Cited
UNITED STATES PATENTS
881,471  3/1908  Hoffman .................. 29/148.4

3,013,327  12/1961  Spence ......................... 29/148.4

Primary Examiner—Thomas H. Eager
Attorney—Hopgood and Calimafde

ABSTRACT: A bearing having a full complement of balls is described wherein an outer ring is made of a wrought heat-resistant alloy and provided with a depth-of-track to ball-diameter ratio of at least 1 : 10. Cobalt base and nickel base alloys or a combination thereof have been found to be particularly useful with this type of bearing. A method of making the bearing includes preassembling a bearing structure by placing a thermally expanded conical outer ring over an assembly comprising an inner ring and a full complement of balls within the inner ring face. Subsequently, the conical outer ring is compressed to bring a tapered portion thereof towards the balls and produce the desired depth-of-track to ball-diameter ratio with final radial clearance and fit. A particular selection of component parameters is described for the manufacture of the device.

PATENTED MAY 25 1971 3,579,780
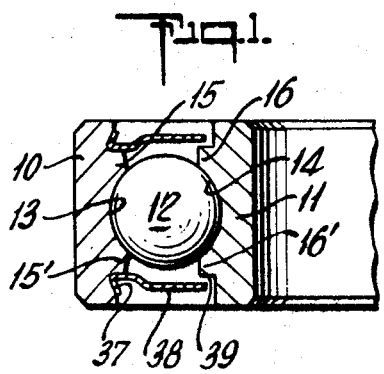
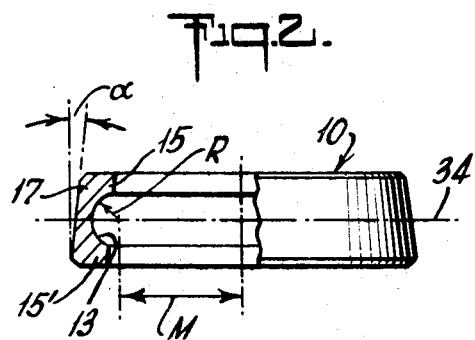
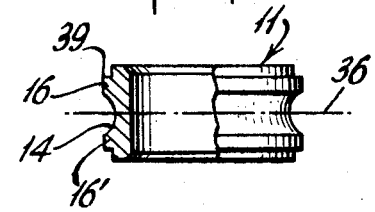
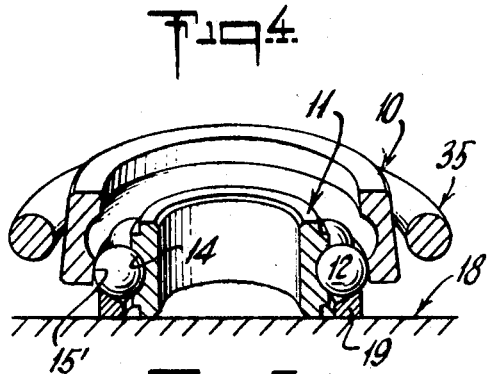
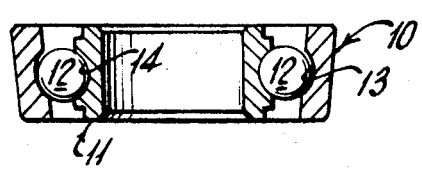
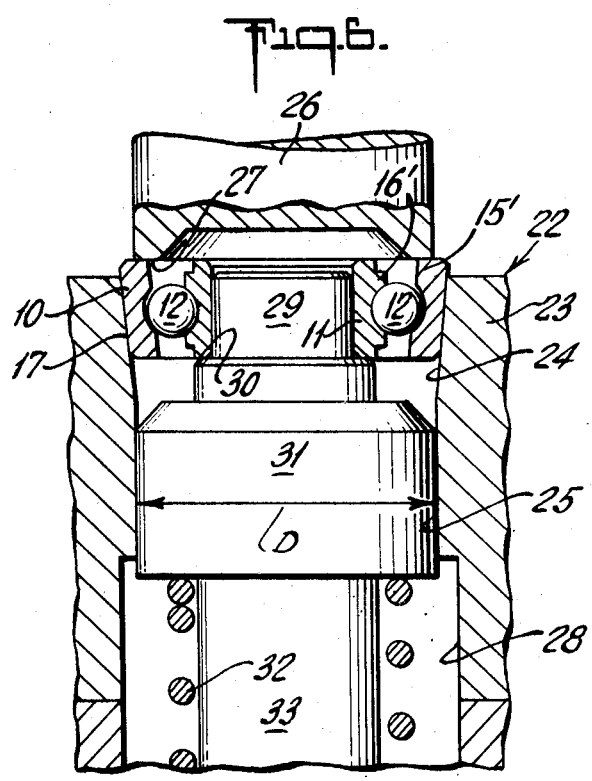
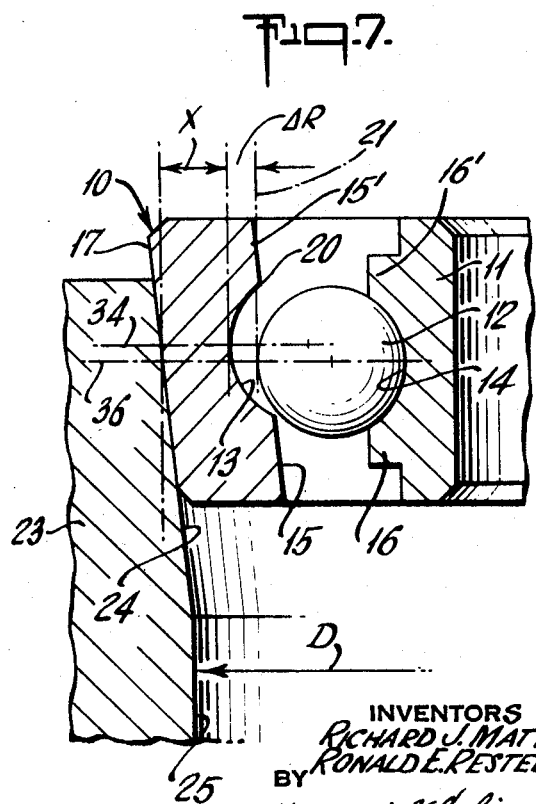
INVENTORS
RICHARD J. MATT
RONALD E. PESTELLI
BY
Hopgood & Calimafde
ATTORNEYS

METHOD OF MAKING A BEARING HAVING A FULL COMPLEMENT OF BALLS

It has long been recognized that it would be desirable to provide ball bearings having uninterrupted raceways which have no break in their continuity, that is, raceways that have no notch or slot or any line of separation or demarcation resulting from the use of a plurality of raceway sections for obtaining the assembly of a full complement of ball elements within the bearing.

Various methods have been proposed for providing uninterrupted grooved raceways. One method comprises telescoping a solid inner annular member of finished size within a solid outer annular member also of finished size, with the raceway of one oppositely disposed to the raceway of the other. One of the members would then be displaced eccentrically in the same plane relative to the other to form a crescent-shaped spacing between them into which a limited number of balls could be introduced and subsequently distributed by thereafter concentrically spacing their inner and outer members, with the balls held apart by separator or spacing devices. While this method resulted in solid or continuous raceways, it had its disadvantages in that a full complement of balls could not be inserted and the bearings produced fell short of the ideal full complement bearing.

Yet another method comprises producing the inner annular member sufficiently undersized in diameter or the outer annular member sufficiently oversized in diameter to enable assembly of the balls, placing the balls in the raceway of one member and holding them in position by a cage or other means, telescoping the two elements concentrically with the caged balls in place and radially deforming the off-sized bearing member either by expanding the inner or compressing the outer member. Thus the members are interlocked in cooperative relation with one another through the ball elements. The disadvantage here is that in order to carry out the step of assembling the ball elements, the elements must be held in one of the raceways by a cage or other device in order to clear the annular opening between the two members and to ensure precise positioning of the elements during, for example, the radial expansion of the undersized inner bearing member to avoid mutilation of the raceways or brinelling of the surface adjacent the raceways.

In the U.S. Pat. to Hoffmann, No. 881,741, a method is described for manufacturing a bearing having a full complement of ball elements by rapidly expanding the outer raceway member by the application of heat thereto and at the instant of maximum expansion, moving the inner and outer raceway members as well as the ball elements within the same plane. As shown and described in this patent, the outer raceway member comprises a ring having an external surface substantially parallel to the central axis of the bearing. There is no flaring of the external raceway member and as a result a disadvantage arises. One is limited to the depth of the raceway by the expansion characteristics of the material used. In general even for steel, which has a relatively high coefficient of expansion, the depth of the outer raceway cannot be too great lest it be impossible to pass the heated outer ring over the inner raceway member and the full complement of balls. Consequently the capability of such a bearing to withstand axial loads is substantially reduced. The shoulders adjacent the balls are of such limited height that such bearing would not adequately serve the market requirements of today's bearings.

In the U.S. Pat. to Spence, No. 3,013,327, a method for constructing a bearing having a full complement of balls is described wherein the outer raceway member is flared sufficiently to freely passover the assembly including the inner raceway member and the full complement of balls. The preassembled inner and outer raceway members are then passed through a die which compresses the flared outer ring member. The disadvantage of this method of construction resides in the fact that the throat opening of the outer raceway member must be so large that the subsequent compressing step involves a relatively high degree of material working. As described in the Spence Patent, the curvature of the raceway in the outer member is larger than that of the balls so that the shoulder heights adjacent the raceway are either quite low or, if they are high, a large flare angle must be used. The low ratio of shoulder height to ball diameter produces an inadequate axial load capability whereas the large flare angle imposes too much working of the material.

We have invented a method of assembling a bearing having a full complement of balls wherein the disadvantages inherent in the above-described prior art methods are overcome.

It is therefore an object of our invention to provide a bearing having a full complement of balls and which is capable of high axial loads with a long life.

It is a further object of this invention to provide a so-called full-complement ball bearing and method of making the same, wherein a relatively high ratio is provided for race depth in the outer bearing ring in relation to ball diameter.

It is still further an object of this invention to provide a bearing having a full complement of balls wherein the outer raceway member is made of a material capable of some deformation without loss of hardness.

An overall object is to achieve the above objects with a construction and method in which deformation of the outer bearing ring establishes the bearing-element relationships ultimately desired for running; in other words, it is an object that no running-in, freeing-up, grinding or heat-treating steps are needed after such deformation, the running parts then inherently having their desired running relationships and characteristics.

These objects are accomplished by our invention which is described as follows in conjunction with the drawings wherein:

FIG. 1 is a longitudinal half-section of a bearing of the invention;

FIGS. 2 and 3, respectively, are views in elevation of outer and inner bearing rings, before incorporation in the bearing of FIG. 1, parts being broken-away and shown in longitudinal section;

FIG. 4 is an isometric view of the parts of FIGS. 2 and 3, in a step of preassembly with a complement of balls, the view being broken and sectioned on a plane through the bearing axis;

FIG. 5 is a longitudinal sectional view through parts preassembled after the step of FIG. 4;

FIG. 6 is a longitudinal section through tooling used in operating upon the preassembly of FIG. 5; and FIG. 7 is an enlarged fragmentary view to illustrate and identify relationships related to FIG. 6.

Briefly stated, our invention contemplates a method of making a bearing having a full complement of balls wherein a flare-shaped outer-ring member having a concave raceway is passed over an assembly comprising a hardened inner-ring member and a full complement of balls, by providing a work-hardened ductile outer-ring member of selected material, selecting the desired ultimate radial play of the bearing, permanently deforming the outer-ring member by radially compressing the same to bring the flared portion towards the balls to an extent beyond that required to achieve such radial play, and releasing the compression to allow the outer-ring member to spring back to an unstressed permanently deformed shape; the extent to which compressional displacement is carried is such that the desired radial play characterizes the sprung-back relationship.

Referring to FIG. 1, the invention is shown in application to an antifriction bearing comprising outer and inner race rings 10–11, with balls 12 as the antifriction elements supported by and between said rings. The respective rings 10–11 have opposed raceways 13–14 of sectional radius of curvature just exceeding that of balls 12. The balls are supplied as a so-called full complement, and ride relatively deep races between circumferentially continuous shoulders 15–15' on the outer ring 10 and similarly continuous shoulders 16–16' on the inner ring. For the typical bearing which will be discussed herein, 13 3/16-inch diameter balls ride so-called 51—56 percent races, on a pitch diameter of 0.7931 inch, and with a radial play in the range of 0.0005 to 0.0020 inch; the bearing has a ½ inch diameter bore and a 1⅛-inch outer diameter.

According to a feature of the invention, and as shown in FIG. 2, the outer ring 10 is initially frustoconical, having an outer surface which is tapered or flared at an angle $\alpha$ with respect to the axis of ring 10; typically and preferably the angle $\alpha$ is 6°, although variation of this angle is possible, for various materials and bearing sizes. The inner surfaces at shoulders 15–15' follow the same general flare configuration, shoulder 15 being the smaller and shoulder 15' the larger, in terms of initial bore size. The outer race 13 is initially formed with a sectional radius of curvature which substantially matches the ball curvature, but at a radial offset $M$ which exceeds its ultimate spacing from the ring axis, to substantially the extent $\Delta R$ (to be later explained in connection with FIG. 7). In the process to be described, the radial offset $M$ is reduced and the outer ring is deformed to generally cylindrical shape; in this deformation, the radius of race curvature expands, and the desired ultimate size and clearance of all running parts is achieved.

The material of the outer ring 10 may be described as a high-temperature, ductile, work-hardening alloy which is preferably also oxidation and corrosion-resistant; we have found that ring 10 is advantageously made of a wrought heat-resistant alloy of the nickel or cobalt-base types. Cobalt-base alloys are particularly preferred because of their propensity for maintaining hardness at elevated temperatures and with some deformation. Broadly speaking, such heat-resistant alloys comprise about 10 to 30 percent by weight of chromium, up to about 15 percent by weight of molybdenum, up to about 15 to 20 percent by weight of tungsten, up to about 8 percent by weight of columbium, up to about 6 percent by weight of titanium, up to about 6 percent by weight of aluminum, up to about 30 percent iron and substantially the balance at least about 40 percent by weight of a metal selected from the group consisting of nickel, cobalt, and a combination of nickel and cobalt.

The examples of preferred cobalt-base alloys that may be employed include those falling within the range of 10 to 30 percent chromium, 5 to 25 percent nickel, up to about 10 percent molybdenum, about 2 to 20 percent tungsten, up to about 5 percent columbium, up to about 10 percent iron, and substantially the balance at least about 40 percent cobalt. As will be appreciated, small amounts of manganese and/or silicon may be present.

Nickel-base alloys falling within the broad composition range include the age-hardened variety comprising about 10 to 30 percent chromium, up to about 30 percent cobalt, up to about 10 percent molybdenum, up to about 5 percent tungsten, up to about 5 percent columbium, about 1 to 5 percent titanium, about 1 to 5 percent aluminum, and substantially the balance of at least 40 percent nickel. Small amounts of other elements may be present such as manganese, silicon, etc.

Typical materials available for making the outer ring are such as the Haynes No. 25 or its equivalent, such as Universal Cyclops L-605, Crucible WF-11, Allvac-605, or Allegheny Ludlum Altemp L-605.

Before deformation, the outer ring 10 has been hardened to such an extent that its race 13 exhibits a Rockwell-C hardness of at least 40 and preferably, as with the cobalt-base alloy, a Rockwell-C hardness of between 50 and 65.

In the method of the invention, the inner ring 11 (FIG. 3) is not deformed. It is finished before assembly and may be made to the same material and hardness specifications as the outer ring 10. The race curvature at 14 may thus range 51 to 56 percent of the ball diameter. It may be conventionally fabricated from tubular stock, for the case of the bored inner ring shown.

A preassembly of the bearing is made as shown in FIG. 4 wherein the inner ring 11 is placed on a horizontal supporting fixture or table 18, equipped with an upstanding ring 19 to hold the balls 12 at the central plane of the race 14. Preferably, the upper surface of ring 19 is grooved or otherwise formed to naturally position all balls 12 in contact with the bottom of (i.e. maximum depth in) race 14. The outer ring 10 (FIG. 2) is then placed over ring 11 and balls 12, and a slight interference at shoulder 15' holds the outer ring 10 poised short of full assembly; this interference is suggested by projection of corner 20 of shoulder 15' radially within the locus suggested at 21 for outer extremities of balls 12 fully seated in the inner race 14 (see FIG. 7).

To permit assembly thermal action is relied upon to produce sufficient change in size of one of the rings 10–11 to eliminate or substantially reduce the described interference. Such action may be achieved by transient cryogenic treatment of the inner ring 11, allowing the balls to radially inwardly track the shrinkage of the inner raceway; once the interference is sufficiently reduced, the axial overlap of the undeformed outer ring with the inner ring and balls is easily accomplished. In the form shown, however, heat is applied locally and transiently to the outer ring, as by an induction heating element 35 which surrounds the outer ring. Heating proceeds to a temperature between 600° and 1000° F. in a very short time. As a result, the outer ring expands rapidly, and the inner ring 11 and balls 12 are substantially unaffected. When sufficiently expanded, the interference 20–is eliminated, and outer ring 10 falls into place around balls 12. When the outer ring cools, the inner ring 11 and the balls 12 are trapped within the outer ring 10, and become preassembled thereto, as shown in FIG. 5.

The diametral interference between the shoulder 15' and the balls 12 (FIGS. 4, 7) is preferably selected between 0.002 and 0.007 inches, for the typical bearing here described in detail. This selection is made by machining the shoulder 15' to a preselected diameter at corner 20, in terms of the selected ball size as well as the location of race 14 on the inner ring 11. These last three mentioned dimensions are so selected, in terms of the undeformed outer race diameter at 13, that the preassembled structure exhibits a preassembly radial play or diametral clearance $\Delta R$ (FIG. 7) within preselected limits so that the subsequent deformation or swaging step may be performed without cracking the outer ring 10 or damaging the hardened balls 12.

The outer ring of the preassembly is then deformed by passage through a closing or swaging die 22, in which external force is applied, for example by a hydraulic press (not shown), to convert the tapered portion 17 to cylindrical shape; during this conversion, shoulder 15' is axially stretched from shoulder 15 and is also brought into closer proximity to the corresponding inner-ring shoulder 16'.

The die 22 comprises a body 23 having a forming bore with a conical flared entrance 24 which is preferably tapered in accordance with the slope of outer-ring taper at 17. The flared entrance 24 terminates at a straight bore or throat 25 of diameter $D$, representing a predetermined excess of compressional deformation of ring 10, to the extent that on release of compressional confinement within throat 25, the outer ring 10 will spring-back or slightly outwardly expand to provide the desired radial play for a running bearing. The preassembly radial play or diametral clearance $\Delta R$ is thus collapsed to a running radial play, as previously explained.

The parts which align and displace the preassembled bearing through die 22 are shown to include a plunger 26 having a projecting rim 27 to circumferentially uniformly and downwardly drive the outer ring 10; the outer diameter of plunger 26 is such as to clear the throat 25 so that the bearing assembly can be displaced past throat 25 into the region of a counterbore 28, for recovery of the deformed assembly. During this stroke, a centering stud or pin 29 and adjacent shoulder 30 support the inner ring 11. Stud 29 has an enlarged body 31 guided in throat 25 and vertically yieldingly positioned by resilient reaction means 32, surrounding a frame-guided rod 33.

FIG. 7 illustrates in greater detail the particular parameters of the die throat in relation to preassembly dimensions. We have found a relationship to exist between the minimum crosssectional thickness $X$ of the outer ring 1, the preassembly radial play (or diametral clearance) $\Delta R$, and the die throat or closure diameter $D$. These must be so selected and matched as to achieve a properly assembled bearing. If the wrong combination of these diameters is selected, the swaged assembly could have either too much radial looseness, or worse, be too tight, causing potential damage to the bearing balls during the swaging step.

An illustrative example of a proper sizing of these parameters will be given.

The outside diameter of the undeformed outer ring 10, (FIG. 2) measured along the outer race centerline 34, is selected at about 1.160 inches, and the outer race diameter, measured along the same centerline, is formed to about 1.008 inches, providing a thickness of 0.076 inch for dimension $X$. The inner ring 11 is selected with a ½ inch bore and an outside diameter of 0.690 inch, and the inner race 14 is formed with a diameter of 0.603 inch measured along its centerline 36. The balls are selected at 3/16-inch diameter, so that a preassembly radial play or diametral clearance $\Delta R$ of 0.030 is obtained. For this configuration, experimental results have established the optimum throat diameter $D$ at 1.123 inches, using a solid die 22; a slight variation may be expected if a split die is used.

According to the relationship we have discovered, the factors $D$ and $R$ vary linearly and inversely with respect to each other for a given value of $X$. In other words, if for the illustrative case given the radial play or diametral clearance is increased by several thousandths of an inch, the throat diameter $D$ must be reduced by a linearly related amount to compensate for the increased $\Delta R$ by permitting more outer-ring deformation through the die 10.

As already noted, some elongation of the outer ring 10 occurs by reason of passage of the preassembly through the die. This alters the curvature of the outer race 13, enlarging its radius. To compensate for this axial component of deformation, and with an object of achieving say, an ultimate 51 to 56 percent running curvature in race 13, the outer race 13 is initially formed (FIG. 2) to a curvature radius $R$ substantially matching, or even less than, the ball radius (i.e. about 50 percent or less). Also, the centerline 34 of the undeformed outer race may be made slightly offset from the ultimate centerline 36, for example, by about 0.010 inch, in view of the axial and radial deformation due to die action.

In the foregoing description, thermal action has been identified with the preassembly step, and mention has been made of the controlled overcompression of the outer ring, in order to allow for controlled springback to a desired running radial-play relationship. It will be appreciated that the thermal differential between rings 10–11 upon swaging deformation may also be utilized in the establishment of this desired ultimate running relationship. For example, in the case in which cooling is applied to shrink the inner ring for preassembly purposes, the still partially shrunk inner ring may be promptly used in the swaging step, so that, after swaging, the cooled inner ring returning to room temperature may expand to close running clearances to the desired extent. In similar fashion, in the alternate preassembly through heating, the still-heated outer ring may be subjected to swaging and allowed to shrink after swaging, in order to establish the ultimate desired running relationship.

We have described a unique method of manufacturing a bearing having a full complement of balls, permitting relatively large ratios of race depth to ball diameter, in the context of circumferentially continuous race walls or shoulders. The thermal expansion of the outer ring member provides a unique approach to reduce the amount of cold swaging necessary for bringing the outer race into proper alignment with the inner race, avoids cracking or other damage to the outer ring member, prevents damage to the balls during the swaging step and permits use of unusually hard materials. Significantly, hardened and otherwise finished parts may be used, and the degree of springback may be controlled, to establish desired ultimate running relationships by reason of the swage action alone, so that no further finishing is required as to the running parts. Of course, face turning and grinding of the outer ring 10 should be performed after swaging, at which time, if desired, retaining grooves or counterbores, as at 37, are cut for reception of a shield or the like member 30. Shield 38 is shown to extend into radial overlap with a shoulder 39 formed in the inner ring 11 prior to assembly, as will be seen from FIG. 3.

While the invention has been described in connection with specific apparatus, and a specific illustrative example, it is to be clearly understood that modifications can be made without departing from the invention as set forth in the accompanying claims.

We claim:

1. A method of fabricating a bearing having a full complement of balls, comprising forming an inner ring having an annular hardened concave raceway about its external periphery and located between axially displaced shoulders, forming from a wrought heat-resistance material a conically shaped outer ring having a concave raceway of a preselected curvature substantially that of the balls, said outer ring raceway being formed between a first annular radially inward shoulder and a second radially inward annular shoulder having a larger inside diameter than the inside diameter of said first annular shoulder, mounting a full complement of balls of preselected diameter around the raceway of the inner ring wherein the external diameter of the assembly of mounted balls is selected to slightly exceed and thus interfere with said diameter of said second annular shoulder, transiently thermally treating one of said rings with respect to the other of said rings to an extent sufficient to transiently eliminate said interference, axially overlapping said outer ring over said assembly of mounted balls, and compressing the outer ring towards the balls to close said conical outer ring.

2. The method of claim 1, in which said interference is restored after the thermal transient and prior to compressing the outer ring.

3. The method of claim 1, in which said transient thermal treatment involves rapid heating of the outer ring.

4. The method of claim 3, in which said heating is by electromagnetic induction.

5. The method as recited in claim 1, wherein said outer ring is made of a material selected from the group consisting of wrought heat-resistant nickel and cobalt base alloys.

6. The method as recited in claim 5, wherein said outer ring is made of a material comprising 10 to 30 percent by weight of chromium, up to about 15 percent by weight of molybdenum, up to about 20 percent by weight of tungsten, up to about 8 percent by weight of columbium, up to about 6 percent by weight of titanium, up to about 6 percent by weight of aluminum, up to about 30 percent iron, and substantially the balance at least about 40 percent by weight of a metal selected from the group consisting of nickel, cobalt and a combination of nickel and cobalt.

7. The method as recited in claim 6, wherein said outer ring is made of a material comprising between 10 to 30 percent chromium, 5 to 25 percent nickel, up to about 10 percent molybdenum, about 2 to 20 percent tungsten, up to about 5 percent columbium, up to about 10 percent iron and substantially the balance at least about 40 percent cobalt.

8. The method as recited in claim 6, wherein said outer ring is made of a material comprising about 10 to 30 percent chromium, up to about 30 percent cobalt, up to about 10 percent molybdenum, up to about 5 percent tungsten, up to about 5 percent columbium, about 1 to 5 percent titanium, about 1 to 5 percent aluminum, and substantially the balance of at least 40 percent nickel.

9. The method as recited in claim 1, wherein the external diameter of the complement of balls mounted around the raceway of the inner ring exceeds by between 0.002 and 0.007 inch the inside diameter of the shoulder having the larger inside diameter.

10. The method as recited in claim 9, wherein said heat-applying step comprises heating said outer ring to a temperature between 600° and 1,000° Fahrenheit.

11. The method as recited in claim 4, wherein said heating step comprises mounting an induction coil in surrounding relationship with said outer ring and passing an electric current therethrough for expanding said outer ring.

12. The method of making a bearing having inner and outer race rings spaced and retained by a full complement of balls, comprising the steps of selecting a finished hardened inner-ring member and supporting a full complement of balls around and in the raceway thereof, forming from selected hardened ductile material an annular frustoconical outer-ring with a raceway of curvature substantially matching that of the balls, the outer-ring raceway being defined between two circumferentially continuous shoulders of different minimum diameter, both shoulders radially overlapping and therefore interfering with the locus of outer limits of the balls, thermally expanding the outer ring to the point where the maximum-diameter shoulder will no longer substantially interfere with said locus, axially passing the maximum-diameter shoulder over the balls to the point of overlap of said rings, allowing the heated ring to cool, whereby both shoulders interfere with said locus to provide a retained subassembly of undeformed parts, and radially and axially deforming the outer ring to expand the outer-race curvature beyond that of the balls and to radially contract the outer ring into running relation with the balls and inner ring.

13. The method of claim 1, in which the outer ring is compressed before the thermal transient has subsided, whereby after compression, the return of the thermally treated ring to room temperature may serve a shrinking function in establishing a desired running relationship in the bearing.

14. The method of claim 3, in which the heated preassembled outer ring is compressed before it has returned to room temperature.

15. The method of claim 1, in which said transient thermal treatment involves chilling the inner ring.

16. The method of claim 15, in which the preassembly with cooled inner ring is compressed before the inner ring has returned to room temperature.